Nov. 4, 1969  G. JANKOWITZ ET AL  3,476,938
GUN-FLASH DETECTOR
Filed Sept. 20, 1967  2 Sheets-Sheet 1
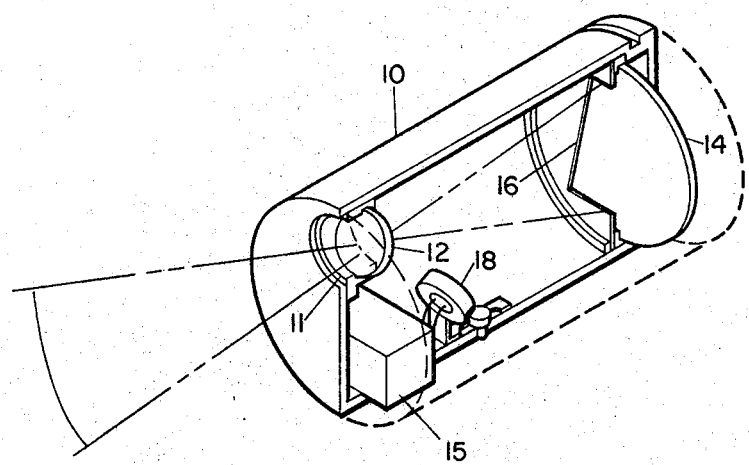
Fig_1
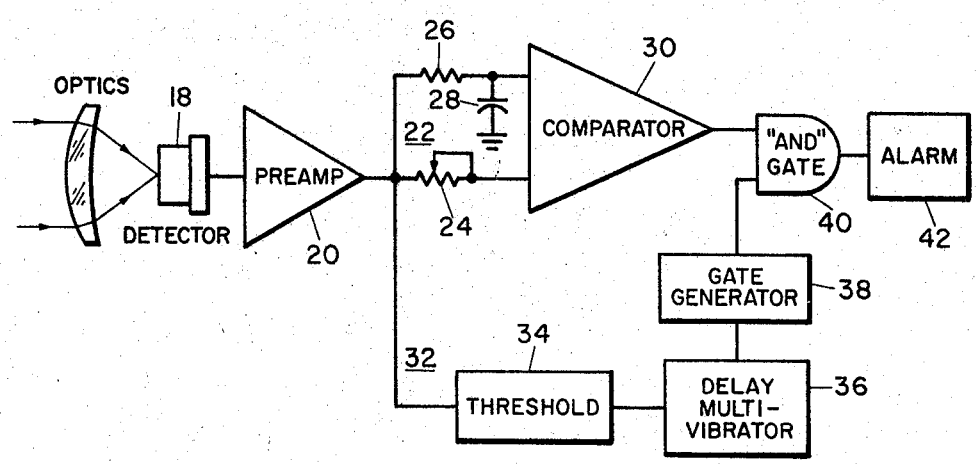
Fig_2
INVENTOR.
GERALD FALBEL
GERALD JANKOWITZ
BY Joseph Levinson

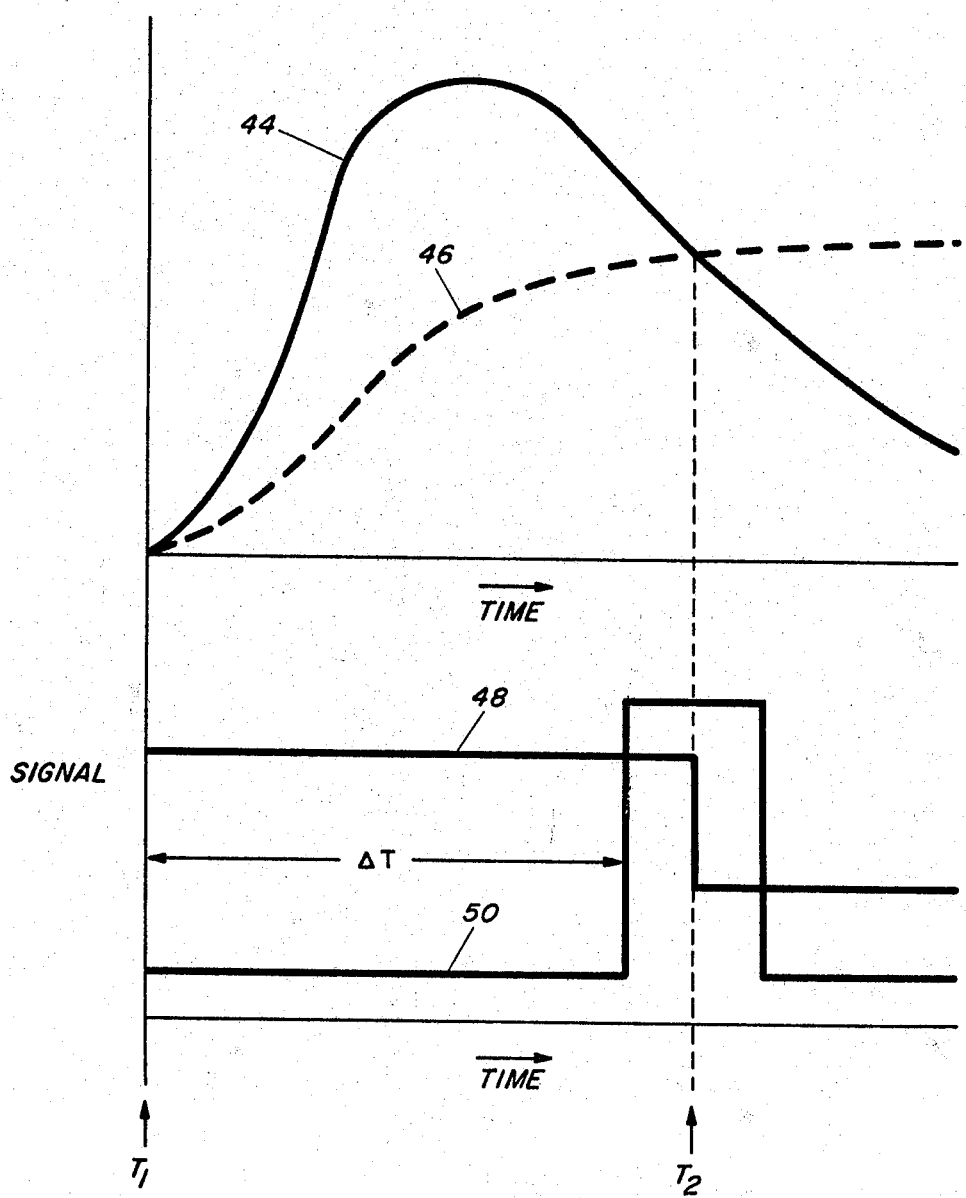
Fig_3

United States Patent Office

3,476,938
Patented Nov. 4, 1969

3,476,938
GUN-FLASH DETECTOR
Gerald Jankowitz, Hillsdale, N.J., and Gerald Falbel, Stamford, Conn., assignors to Barnes Engineering Company, Stamford, Conn., a corporation of Delaware
Filed Sept. 20, 1967, Ser. No. 669,049
Int. Cl. G01t 1/16
U.S. Cl. 250—83.3                        5 Claims

ABSTRACT OF THE DISCLOSURE

The aperture of a small lens is imaged on an IR detector which generates signals from a field of view which may include gun flashes. The gun flash is discriminated from background radiation by comparing the pulse width of a gunfire flash with the output of a fixed multivibrator. A self-adjusting threshold circuit whose pulse width is determined by the integral of the gun flash pulse accomplishes the pulse-width measurement, which is independent of the range of the gun flash.

BACKGROUND OF THE INVENTION

This invention relates to a gun-flash detector which is capable of distinguishing gun flashes in a field of view from other types of environmental or background radiation.

One of the inherent problems associated with any type of system which is utilized to track or identify particular objects or occurrences in a field of view is to distinguish or discriminate the target from other extraneous objects appearing in the field of view along with the target. The problem is complicated more by the distance of the target from the device, which is intended to detect, or locate, the target of interest. In the case of gunfire, the detector generally must be movable over wide areas to detect and locate the direction of gunfire, and in many instances the most feasible means would be for the detector to be airborne. Mobility of the equipment to detect such things as gunfire increase the difficulty in distinguishing the gunfire from background, as well as the economic feasibility of the type of equipment used.

It is accordingly an object of this invention to provide a gun-flash detector which can be operated at high sensitivity without incurring the penalty of abnormally high false alarms. It is further an object of this invention to provide a gun-flash locater of high reliability which is economically practical, easily maintained, mobile, and provides effective background rejection.

SUMMARY OF THE INVENTION

A gun-flash detector is provided using a simple optical means to apply radiation from a field of view which may include gun-flash radiation to an infrared detector. The output of the infrared detector is applied to first and second electronic processing channels. The first channel provides a controlled pulse width in which the pulse width is controlled by the integral of the gun-flash radiation, compared with the gun-flash signal. The second channel provides a delayed pulse signal when the gun-flash signal reaches a predetermined amplitude. The controlled width pulse of the first channel is compared to the delayed pulse of the second channel to provide an output if the controlled width pulse terminates during the interval of the delayed pulse, thus setting an alarm device into operation.

BRIEF DESCRIPTION OF THE DRAWINGS

FIG. 1 is an isometric view, partly broken away, of the gun-flash detector embodied in this invention;

FIG. 2 is an electrical block diagram of the gunflash detector of this invention; and FIG. 3 shows a plurality of waveforms which are useful in the explanation of the schematic block diagram of FIG. 2.

DESCRIPTION OF THE PREFERRED EMBODIMENT

Although the system to be described hereinafter is considered suitable for detection of a wide range of firearms, for example, from pistol fire to cannon fire, the invention is described for purposes of disclosure with respect to a particular class of firearms, i.e. to small arms fire. A characteristic which is utilized in the present invention is the fact that gun flashes radiate at a black body temperature of 1000° K., thereby providing maximum radiation in the 1.2–2.7 micron range of the infrared.

Although a number of optical approaches can be taken in utilizing the applicant's invention, a preferred form is illustrated in FIG. 1. The gunfire detector of this invention is housed in a casing 10 having an aperture 11 therein. A simple lens 12 is positioned behind the entrance aperture 11 and a spherical mirror 14 having a field-defining mask 16 positioned in front thereof, images the entrance aperture 11 onto a detector 18. It is important to note that in the present optical system, the spherical mirror 14 images the entrance aperture 11 onto the detector 18. Systems which image the scene onto the detector are inherently subject to false alarms caused by the image of bright sources moving across the detector and encountering gradients between areas of greater and lesser sensitivity of the detector. Such motion is always encountered when the detector is mounted in moving vehicles such as aircraft. The lens 12 is preferably of low resolution, serving an important function. A high-resolving power lens, for example, would reduce blurring at the field edges, and could yield very sharp field edges. Without some blurring, however, a bright point source coming into or leaving the field of view would produce a momentary pulse of radiation and could slightly increase the probability of triggering a false alarm. When multiple units are utilized, as is contemplated in the present invention, too much blurring would cause undesirable overlapping of adjacent detector fields of view. The low-power lens 12 makes possible intentionally controlled edge blurring sufficient to suppress aperture modulation effects, but far below a level where overlapping would become troublesome. Accordingly the present optical system utilizes a simple glass lens which images the scene on a fast spherical mirror 14, with the field mask 16 at the mirror 14 determining the approximate field edge. The curvature of the mirror 14 provides optical gain, reducing the required detector size. The optical system also offers a wide field of view, of up to 30°.

Although a variety of infrared detectors may be utilized in the gun-flash detector, lead sulfide is preferred in the illustrated embodiment for small arms fire. Lead sulfide has good sensitivity in the infrared range to be measured, with peak sensitivity at 2.7 microns. A small arms gun flash radiates approximately as a 1000° K. black body. For such a source 25% of the energy occurs below 2.8 microns (shorter wavelength) and less than 4° below 1.8 microns (shorter wavelength).

The output of the detector 18 is fed to an electronics unit 15. The detector 18 and electronics 15 function to receive the radiation, convert it to an electrical signal, amplify and compare it with an anticipated pulse characteristic. The gun-flash is discriminated from other bright IR sources in the field of view on the basis of its time history and pulse shape. This is described in connection with the block diagram of FIG. 2 showing the electronics.

Radiation from the field of view is applied to the detector 18, which generates signals in response thereto, which are amplified in a preamplifier 20. Signals from the preamplifier 20 are applied to electronic channels 22 and 32. Assuming that a gun flash occurs in the field of view of the gun-flash detector, a typical waveform depicted by curve 44 in FIG. 3 is applied to the electronic channels 22 and 32. The radiation signal 44 is applied in electronic channel 22 through an attenuator 24 to a non-inverting input of a comparator 30 which is a conventional operational amplifier. At the same time, the radiation signal 44 is integrated by an integrating network consisting of resistor 26 and capacitor 28. The integrated signal is shown as curve 46 in FIG. 3. The integrated signal 46 is fed to the inverting input of the comparator 30, providing an output from comparator 30 represented by curve 48 on FIG. 3. The output waveform 48 is a pulse whose width is $T_2-T_1$ and is constant and independent of signal amplitude. Accordingly, the integrated waveform 46 of the radiation signal 44 is used as an adaptive threshold to obtain a characteristic period $T_1$ to $T_2$, $T_2$ being the point in time where the radiation signal drops below its time integral. The characteristic interval so defined is independent of the signal amplitude, and therefore independent of the range or the obscuration between the detector and the small arms fire. In order to recognize this characteristic interval, the radiation signal 44 is also applied to the second electronic channel 32 to a threshold 34, a delay multivibrator 36, and a gate generator 38. The threshold 34 is set at a predetermined amplitude which depends on the noise level of the preamplifier 20 and normally will be set at five times the amplitude of the noise. The minimum threshold would require the setting to be above the noise level. When the threshold 34 is exceeded, the delay multivibrator 36 is initiated, which in turn triggers the gate generator 38, providing a delayed gate pulse, represented by curve 50 on FIG. 3. The signals 48 and 50 are applied to an AND gate 40, and if the negative-going signal at time $T_2$ on curve 48 appears within the delayed gate 50, an alarm 42 is triggered. Thus the AND gate 40 determines whether the crossover time of the radiation signal 44 and the integral signal 46 of the radiation occur at the proper time. If so, a pulse is generated to trigger the alarm or display 42. Although the characteristics of the various networks will have to be modified in accordance with the class of flashes desired to be detected, as an illustrative example for small arms fire, the threshold and comparator circuits may use a µA709, the delay multivibrator gate generator and AND gate may utilize a 914, all of which are integrated circuits, and the preamplifier 20 may use a DP5 cascaded with a DP6, and the integrating circuit may have a time constant of 5 milliseconds.

It is contemplated by the present invention that a number of gun-flash detector units in accordance with this invention may be grouped to define a large field of view, for example, an entire hemisphere, and the alarm device 42 may be audible as well as visual to indicate which gun-flash locater detector has been activated.

The gun-flash detector of the present invention is simple, rugged and reliable. It may be mounted in vehicles and aircraft, with a variety of such units defining great flexibility in obtaining the desired area coverage.

We claim:
1. A gun flash detector comprising:
 (a) an infrared detector,
 (b) optical means for applying radiation from a field of view which may include gunflash radiation to said infrared detector,
 (c) electronic means having first and second channels to which said detector is coupled for processing signals received from said detector,
 (d) said first channel providing a controlled width pulse in response to signals from said detector with the pulse width controlled by a comparison between the gun flash radiation and its integral,
 (e) said second channel providing a delayed pulse after the signal applied reaches a predetermined amplitude,
 (f) a gate means coupled to said first and second channels for providing an output when the controlled width pulse terminates during the interval of the delayed pulse, and
 (g) an alarm device coupled to said gate means for actuating said alarm device when said gate means provides an output.

2. The gunflash detector set forth in claim 1 wherein said optical means comprises a field lens and spherical mirror with a field defining mask positioned in front of said mirror for imaging the aperture of said lens onto said infrared detector.

3. The gunflash detector set forth in claim 1 wherein said first channel includes a comparator circuit having two inputs and one of said inputs includes an integrating circuit.

4. The gunflash detector set forth in claim 3 wherein said second channel includes a threshold circuit, a delay multivibrator and a gate generator connected in the named order.

5. A radiation flash detector for discriminating between predetermined infrared radiation flashes and all other undesired radiation, comprising
 (a) a detector responsive to desired infrared radiation flashes of predetermined duration as well as to other undesired radiation producing signals in accordance with both desired and undesired radiation received,
 (b) means coupled to said detector for providing a controlled width pulse in response to signals from said detector, said means controlling the pulse width by comparing the desired radiation flashes of predetermined duration with its integral,
 (c) other means coupled to said detector for generating a delayed pulse when said detector signals reach a predetermined amplitude,
 (d) gate means having said delayed pulse and said controlled width pulse applied thereto for producing an output only when said controlled width pulse occurs within the interval of said delayed pulse whereby an output is produced only for desired infrared radiation flashes of predetermined duration.

References Cited
UNITED STATES PATENTS

| | | | |
|---|---|---|---|
| 3,147,380 | 9/1964 | Buckingham et al. | 250—83.3 |
| 3,147,384 | 9/1964 | Fenton et al. | 250—83.3 X |
| 3,353,022 | 11/1967 | Schwartz | 250—83.3 |

RALPH G. NILSON, Primary Examiner

A. B. CROFT, Assistant Examiner

U.S. Cl. X.R.

250—83